May 20, 1930.   F. BAUER   1,759,032
AIRPLANE
Filed Feb. 18, 1928    7 Sheets-Sheet 1

Inventor
Frank Bauer

Inventor
Frank Bauer

May 20, 1930.　　　　　F. BAUER　　　　　1,759,032
AIRPLANE
Filed Feb. 18, 1928　　　7 Sheets-Sheet 3

Inventor
Frank Bauer.

May 20, 1930.  F. BAUER  1,759,032
AIRPLANE
Filed Feb. 18, 1928  7 Sheets-Sheet 4

Inventor
Frank Bauer

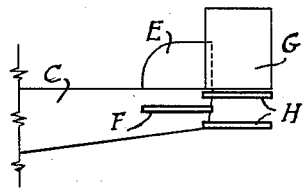
Fig.23
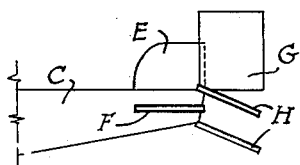
Fig.24
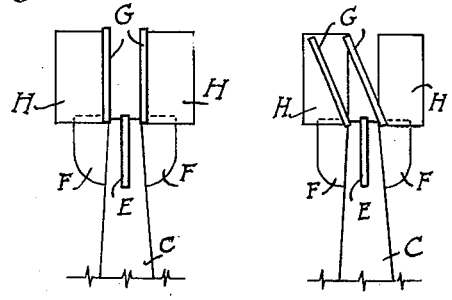
Fig.25  Fig.26
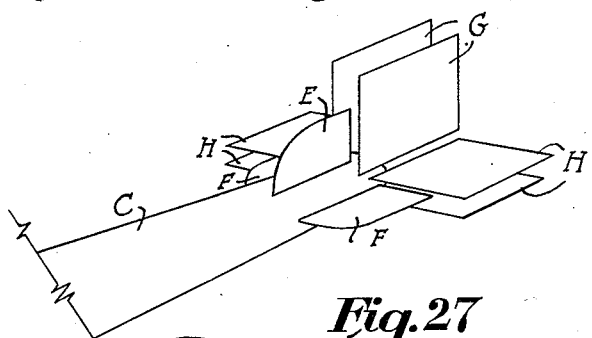
Fig.27
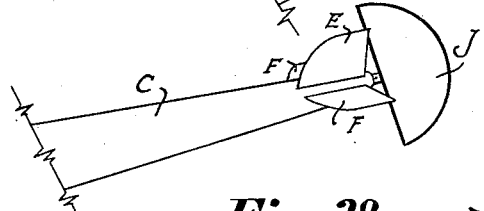
Fig.28

May 20, 1930.   F. BAUER   1,759,032
AIRPLANE
Filed Feb. 18, 1928   7 Sheets-Sheet 6

Frank Bauer   Inventor

Patented May 20, 1930

1,759,032

UNITED STATES PATENT OFFICE

FRANK BAUER, OF WILLIAMSVILLE, NEW YORK

AIRPLANE

Application filed February 18, 1928. Serial No. 255,368.

This invention relates to aircraft and particularly the airplane type in which the body, planes, ailerons and tail are of novel and improved construction to provide increased strength, safety, reliability and stability and providing climbing and braking means and preventing nose dives and tailspins in flying machines.

In carrying out my invention the planes are formed by girders continuing from the main girders of the fuselage and tapering from their inner position next to the fuselage to the extreme tips, with the upper and underneath surfaces containing curvatures longitudinally and transversely, approximating the contour of soaring bird's wings. Co-operating with the planes in climbing, braking, keeping perfect control and preventing tailspins and nose-dives, are various types of ailerons that are pivoted, swung and raised or lowered thereto and manually operated. Another type of ailerons when flying normally are inactive but automatically operate in case of emergency to prevent nose-dives and tail-spins. The rear part of the fuselage tapers into a tail to which are attached a pair of rudders and a double pair of elevators.

Other features of the invention and the advantages thereof will appear from the following detailed description:—

Fig. 23 is a section of a side elevation view of the airplane's tail.

Fig. 24 is a section of a side elevation view of the airplane's tail.

Fig. 25 is a section of a plan view of the airplane's tail.

Fig. 26 is a section of a plan view of the airplane's tail.

Fig. 27 is a section of a perspective view of the airplane's tail.

Fig. 28 is a section of a perspective view of the airplane's tail.

Similar letters and numerals refer to similar parts throughout the various drawings.

Referring to the drawings:—

Figure 1:
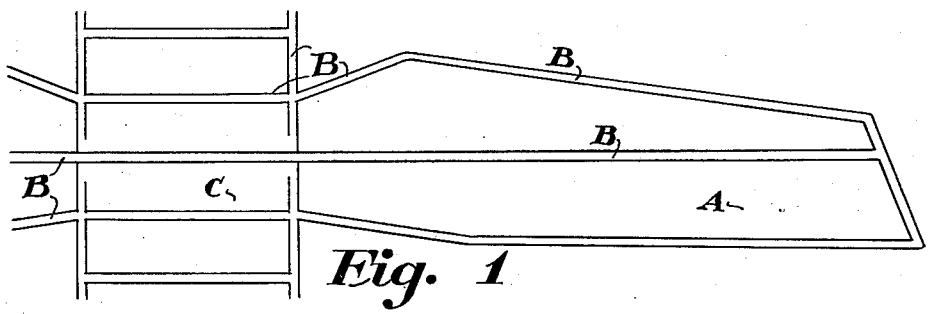
Fig. 1 is a plan view section of the wings and fuselage.
Figure 2:
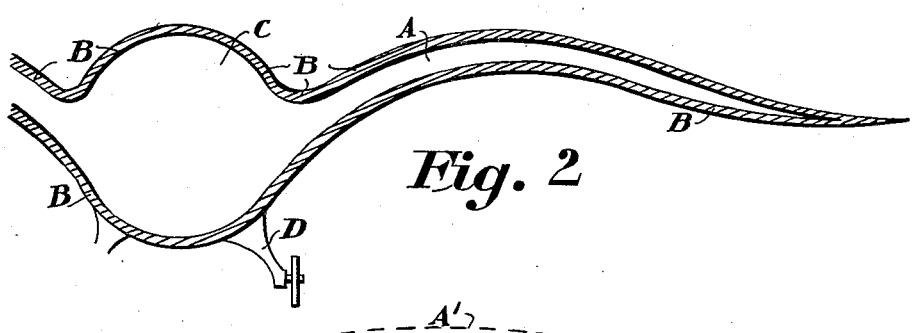
Fig. 2 is an elevation view section of the wings and fuselage.
Figure 5:
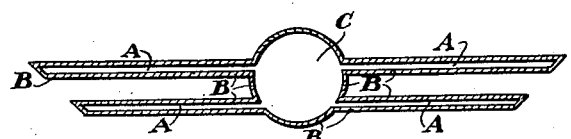
Fig. 5 is an elevation view in cross section of the wings and fuselage.

In Figs. 1 and 2 shows how to build an airplane more safe than built heretofore by having the main wing girders B one and continuous with the main fuselage girders B. The fuselage is shown as C and A are the wings and D is the under carriage. Fig. 5 shows how the main girders B that are continuous in the fuselage C and wings A, are in an airplane of the biplane type.

Figure 3:
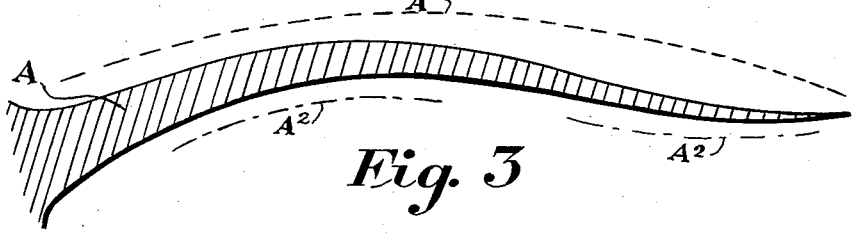
Fig. 3 is an elevation view in longitudinal cross section of the wing.

In Fig. 3 shows the curves of the wing A in the longitudinal way showing there is a main curve $A^1$ that has secondary curvatures $A^2$ superimposed on it.

Figure 4:
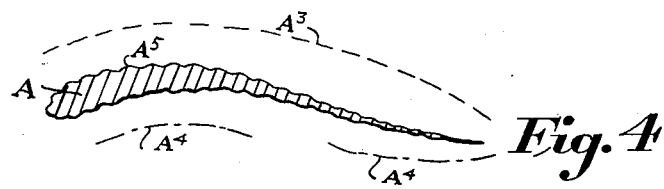
Fig. 4 is an elevation view in transverse cross section of the wing.

In Fig. 4 shows the curves of the wing A in the transverse way showing there is a main curve $A^3$ that has secondary curvatures $A^4$ superimposed on it and that these secondary curvatures $A^4$ have tertiary curvatures $A^5$ superimposed on them.

These longitudinal curvatures, $A^1$ and $A^2$ and these transverse curvatures $A^3$, $A^4$ and $A^5$ help make this airplane more reliable and safe by helping keep the airplane in an upright position and keeping the rolling, yawing and pitching motions to a minimum. All these curvature shapes were decided upon after the studying of the shapes of wings of birds that soar.

Figure 6:
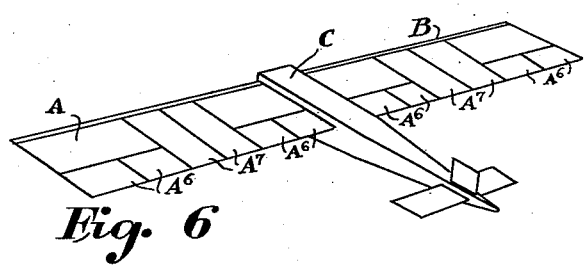
Fig. 6 is a perspective view of the airplane.
Figure 7:
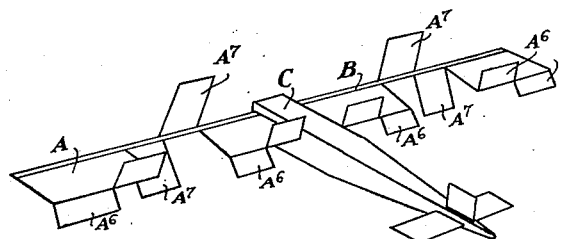
Fig. 7 is a perspective view of the airplane.
Figure 8:
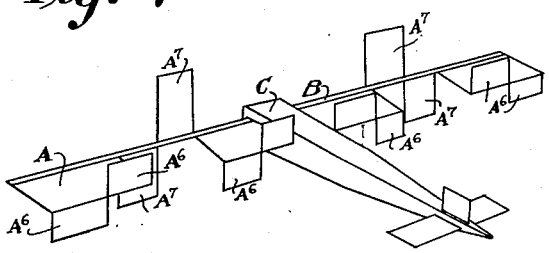
Fig. 8 is a perspective view of the airplane.

In Figs. 6, 7 and 8 shows how the forward motion and momentum of this airplane may be stopped within the minimum of space by the use of brakes $A^6$ and $A^7$. These brakes $A^6$ and $A^7$ being part of the wings A and being movable. Fig. 6 shows the brakes $A^6$ and $A^7$ not being used; Fig. 7 shows the brakes $A^6$ and $A^7$ at the intermediate stage of their utilization; Fig. 8 shows the brakes $A^6$ and $A^7$ at the maximum braking stage. $A^6$ shows the smaller braking sections of the wing A; $A^7$ shows the braking section across the entire transverse part of the wing A. B shows the main continuous girder of the wings A and fuselage C.

In Figs. 9, 10, 11, 12 and 13 shows how this airplane can be controlled by having new types of ailerons whose positions are across the whole width of the wing so as to have maximum stability while in flight, taking off and landing and also when in engine trouble. C shows the fuselage. A shows the wing. $A^8$ shows an aileron that is movable in its horizontal plane up and down by swinging from the aileron edge that is fastened to the wing proper. $A^9$ shows an aileron that is movable in its horizontal plane up and down swinging from the edge that is fastened to the wing proper and said aileron being also able to move by pivoting it on its longitudinal axis while the aileron as a whole can be moved at any angle from the wing proper. $A^{10}$ shows an aileron that can be moved in any desired direction in the horizontal plane up and down in the vertical plane sideways and that can be turned to any degree angle from the said vertical and horizontal planes.

Figure 14:
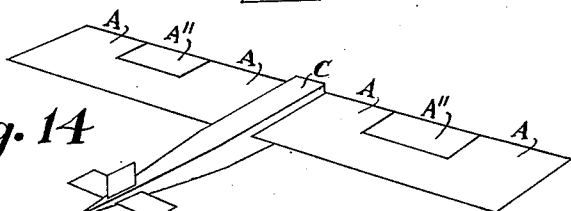
Fig. 14 is a perspective view of the airplane.
Figure 15:
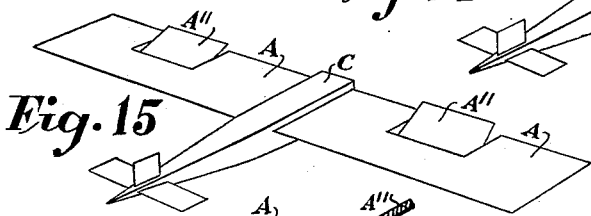
Fig. 15 is a perspective view of the airplane.
Figure 16:
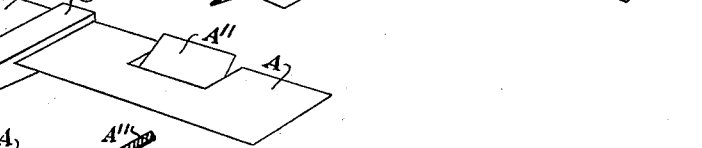
Fig. 16 is an end cross section view of the wing.

In Figs. 14, 15 and 16 shows how this airplane is able to climb quicker by having a new type of aileron whose position is in the forward part of the wing being placed approximately halfway between the fuselage and the wing tip. C shows the fuselage. A shows the wing. $A^{11}$ shows an aileron that is movable by pivoting it on its longitudinal axis.

Figure 17:
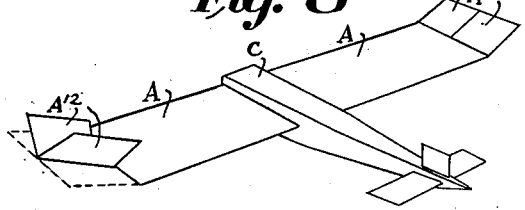
Fig. 17 is a perspective view of the airplane.
Figure 10:
Fig. 10 is a front elevation view of the airplane.
Figure 9:
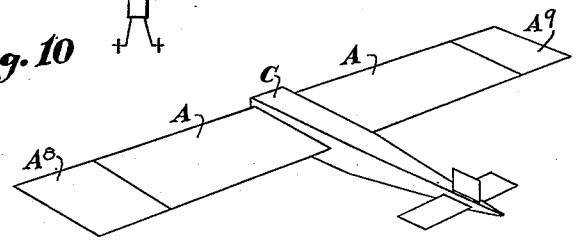
Fig. 9 is a perspective view of the airplane.
Figure 11:
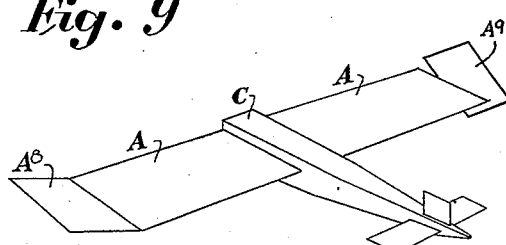
Fig. 11 is a perspective view of the airplane.
Figure 12:
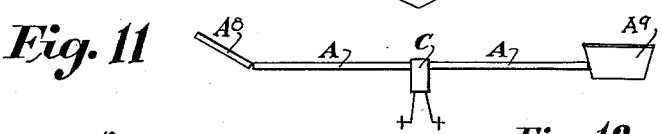
Fig. 12 is a front elevation view of the airplane.
Figure 13:
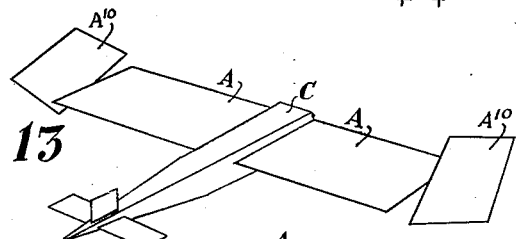
Fig. 13 is a perspective view of the airplane.

In Fig. 17 it shows how an airplane may be controlled by having a new type of aileron whose position is across the whole width of the wing so as to have maximum stability while in flight, taking off and landing and also when in engine trouble. C shows the fuselage. A shows the wing. $A^{12}$ shows an aileron that is movable in its horizontal plane up and down swinging from the edge that is fastened to the wing proper and said aileron being divided longitudinally into two movable parts these two parts of said aileron can be made to fold upward or downward at any angle while the aileron as a whole is moved at any angle from the wing proper.

Figure 18:
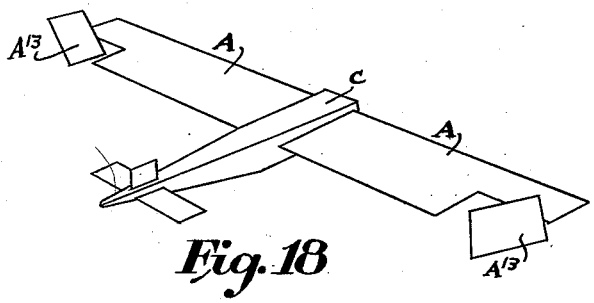
Fig. 18 is a perspective view of the airplane.

In Fig. 18 it shows how an airplane can be controlled by having a new type of aileron whose position is in the rear part of the wing placed at or near the tip of the wing so as to have maximum stability while in flight, taking off and landing and also when in engine trouble. C shows the fuselage. A shows the wing. $A^{13}$ shows an aileron that can be moved in the horizontal plane up and down and in the vertical plane sideways and that can also be turned to any degree angle from said vertical and horizontal planes.

Figure 19:
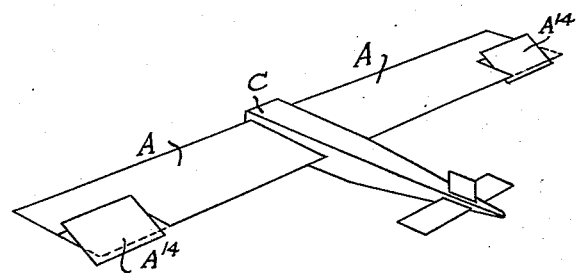
Fig. 19 is a perspective view of the airplane.

In Fig. 19 it shows how an airplane can be controlled by having a new type of aileron whose position is in the rear part of the wing placed at or near the tip of the wing so as to have maximum stability while in flight, taking off and landing and also while in engine trouble. C shows the fuselage. A shows the wing. $A^{14}$ shows an aileron that is movable by pivoting it on its longitudinal axis.

Figure 20:
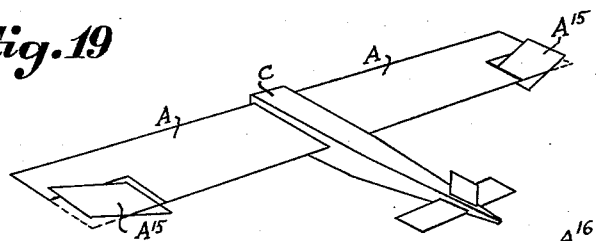
Fig. 20 is a perspective view of the airplane.

In Fig. 20 it shows how an airplane can be controlled by having a new type of aileron whose position is in the rear part of the wing placed at or near the tip of the wing so as to have maximum stability while in flight, taking off and landing and also while in engine trouble. C shows the fuselage. A shows the wing. $A^{15}$ shows an aileron that is movable by pivoting it on its transverse axis.

Figure 21:
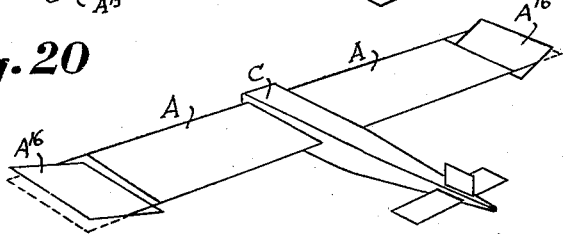
Fig. 21 is a perspective view of the airplane.

In Fig. 21 it shows how an airplane can be controlled by having a new type of aileron whose position is across the whole width of the wing so as to have maximum stability while in flight, taking off and landing and also when in engine trouble. C shows the fuselage. A shows the wing. $A^{16}$ shows an aileron that is movable by pivoting it on its transverse axis.

Figure 22:
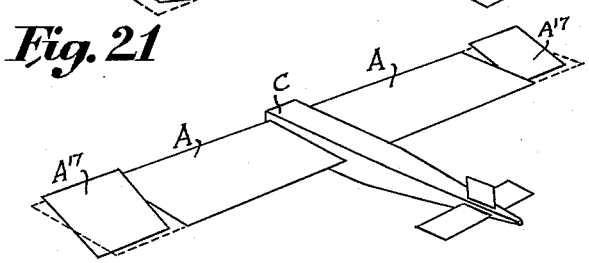
Fig. 22 is a perspective view of the airplane.

In Fig. 22 it shows how an airplane can be controlled by having a new type of aileron whose position is across the whole width of the wing so as to have maximum stability while in flight, taking off and landing and also when in engine trouble. C shows the fuselage. A shows the wing. $A^{17}$ shows an aileron that is movable by pivoting it on its longitudinal axis.

In Figs. 23, 24, 25, 26 and 27 it shows an airplane having a double rudder and a double elevator. This makes the airplane maneuver better than heretofore; it makes the airplane safer and also helps prevent tail-spins. C is the tail part of the fuselage. E is a stationary vertical fin preceding the two rudders G, and E the stationary vertical fin deflects and guides the air onto G the double rudders. F are the stationary horizontal fins preceding the two sets of double elevators H. These stationary horizontal fins F guide and deflect the air onto H the double elevators.

In Fig. 28 it shows an airplane having a rudder that can be moved in any desired direction in the horizontal plane up and down; in the vertical plane sideways and that can be turned to any degree angle from the vertical and horizontal planes. Said rudder J being placed behind the stationary vertical fin E and the stationary horizontal fins F, said fins E and F deflecting and guiding the air onto said J the rudder. With this type of rudder it is easier to maneuver the airplane and it also eliminates the use of elevators.

Figure 29:
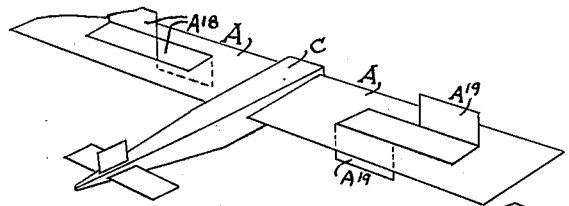
Fig. 29 is a perspective view of the airplane.
Figure 30:
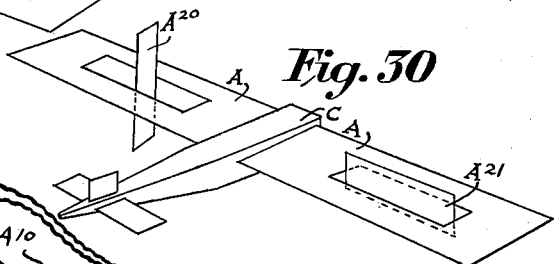
Fig. 30 is a perspective view of the airplane.
Figure 31:
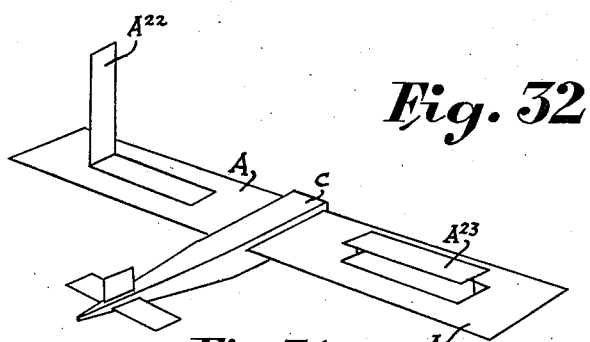
Fig. 31 is a perspective view of the airplane.

In Figs. 29, 30 and 31 it shows how an airplane can be controlled by having a new type of aileron whose shape is rectangular and is placed in the middle of the wing area and whose longitudinal section runs with the longitudinal section of the wing, so as to have maximum stability while in flight and also when in engine trouble and also to prevent tail-spins. C shows the fuselage. A shows the wing. $A^{18}$ shows a rectangular aileron whose longitudinal section is divided into two equal sections these two sections being movable so that when operated one section will move upward and one section will move downward simultaneously both sections swinging from the front longitudinal line of the aileron. $A^{19}$ shows a rectangular aileron whose longitudinal section is divided into two equal sections these two sections being movable so that when operated one section will move upward swinging from the front longitudinal line of the aileron and one section will move downward swinging from the back longitudinal line of the aileron both sections moving simultaneously. $A^{20}$ shows a rectangular aileron that is movable by pivoting it on its transverse axis. $A^{21}$ shows a rectangular aileron that is movable by pivoting it on its longitudinal axis. $A^{22}$ shows a rectangular aileron that is movable in an upward direction swinging from that transverse line of the aileron which is nearest to the wing tip. This aileron may also be made to move downward. $A^{23}$ shows a rectangular aileron that is movable in an upward direction so that the whole of the aileron area is parallel with the wing area when moved at any distance above the wing. This aileron may also be made to move downward.

Figure 32:
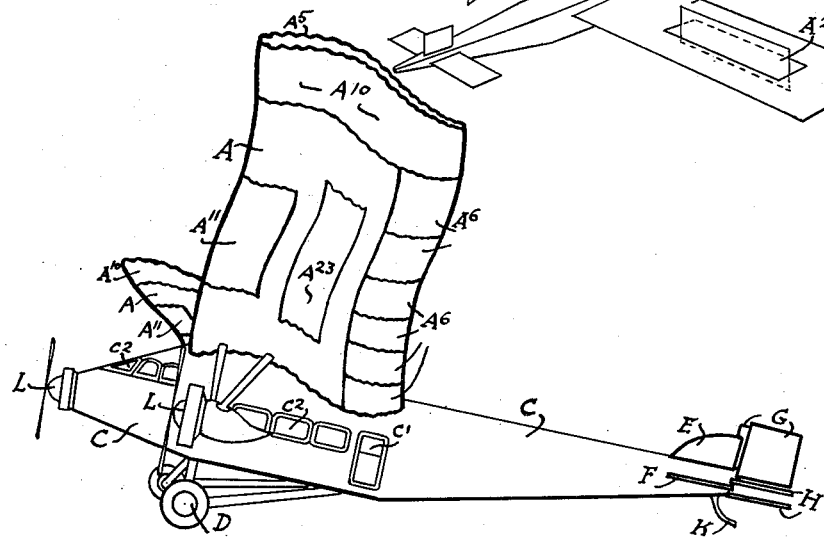
Fig. 32 is a side elevation view of the entire airplane.

In Fig. 32 it shows an airplane that has some of these new climbing, braking, stability and preventing-of-tail-spin ailerons, double rudders and double elevators; these new devices making said airplane as safe and secure as is possible to make them; also to make said airplane take off quicker, climb quicker and to land in smaller areas. C is the fuselage, $C^1$ is the entrance to the airplane cabin, $C^2$ are the windows. D is the undercarriage. L are the motors. E is the stationary vertical fin. F is the stationary horizontal fin. G is the double rudder. H is the double elevator. K is the tail skid. A is the wing. $A^5$ are the tertiary wing curvatures. $A^6$ are the breaking ailerons. $A^{10}$ shows a stability aileron. $A^{11}$ shows a climbing aileron. $A^{23}$ shows an aileron that prevents tail-spins.

Figure 33:
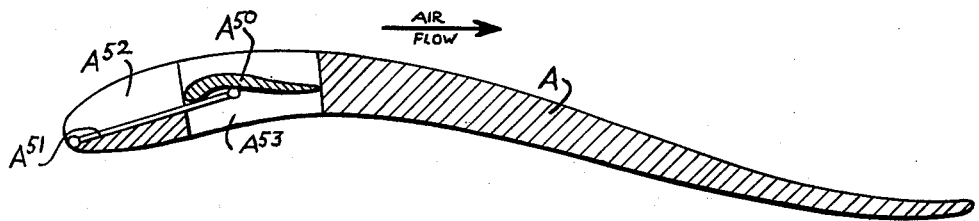
Fig. 33 is a cross section elevation view through the transverse part of the wing.
Figure 34:
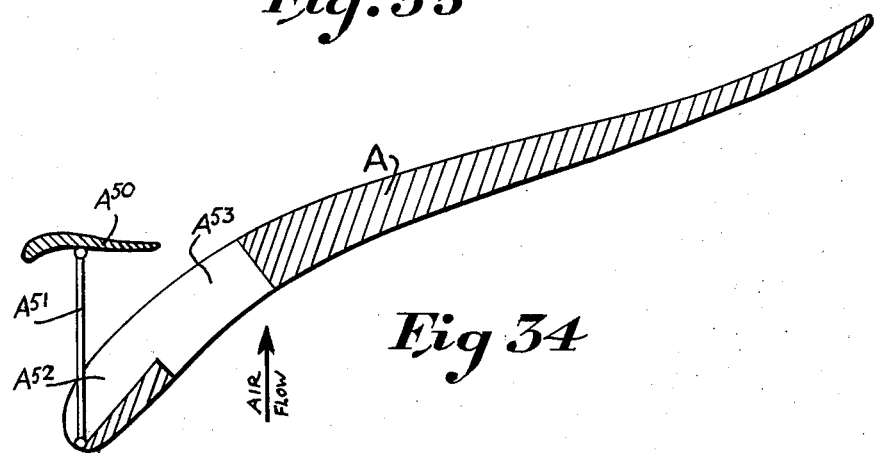
Fig. 34 is a cross section elevation view through the transverse part of the wing.
Figure 35:
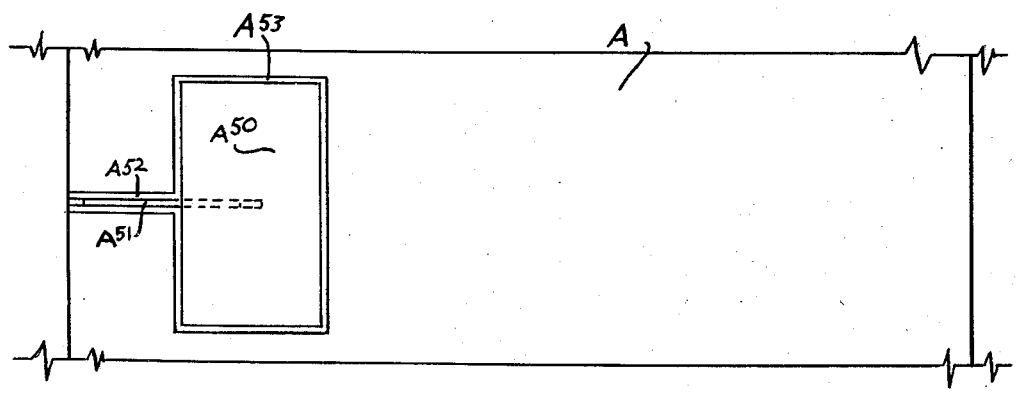
Fig. 35 is a section of the plan view of the transverse part of the wing.

In Figs. 33, 34 and 35 it shows a small rectangular aileron $A^{50}$ located about one width of said aileron back from the front edge of the wing A and there are a few of these ailerons $A^{50}$ located in the forward part of the wing A; these ailerons $A^{50}$ when inactive are located within the upper and lower lines of the wing camber. These ailerons $A^{50}$ work automatically. When the forward edge of the wing is forced downward the up-rushing flow of air forces these rectangular ailerons $A^{50}$ out of the wing proper to a small distance from the wing A. These ailerons $A^{50}$ are held to the front edge of the wing A and being movable upwardly through a slot $A^{52}$, running from the front edge of the wing to the front edge of the ailerons, by means of the rod $A^{51}$ being fastened to the ailerons $A^{50}$ halfway between the ends of the ailerons and halfway back from the front edge of the ailerons the fastening joint being such that the ailerons can pivot forward and backward. The ailerons $A^{50}$ when in use are usually automatically held above the wing A and at right-angles to the flow of air. $A^{53}$ shows the space in the wing A in which the ailerons $A^{50}$ are located. This aileron $A^{50}$ is an automatic safety aileron which prevents flying machines having nose-dives and tail-spins.

Obviously the invention is not limited to the details of the illustrative constructions, all or any of which may be variously modified. Moreover, it is not indispensable that all features of the invention be used conjointly as certain features may be employed to advantage in various combinations and subcombinations.

Having thus described my invention I claim:—

1. In an airplane a wing that has small rectangular ailerons in the forward part of said wing these ailerons being located about one width of such aileron back from the front edge of the wing, these ailerons when inactive are placed within the upper and lower outside lines of the wing camber, and these ailerons are inactive when the airplane is flying forward on an even keel, and these ailerons moving automatically when the forward edge of the wing is forced downward the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron the fastening joint being such that the ailerons can pivot forward and backward and the ailerons when in use are automatically held above the wing and at a right angle to up-rushing flow of air.

2. In an airplane a wing that has small rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron and the fastening joint being such that the ailerons can pivot forward and backward and these ailerons, when in use are automatically held above the wing and at a right angle to the up-rushing flow of air, and the wing openings beneath these ailerons have a sliding panel so that each opening can be opened or closed to let in the upward rush of air or to stop it.

3. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air; said wing being composed of a framework whose main girders are one and continuous with the main girders of the fuselage.

4. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward, the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air; said wing in its width section being composed of a main curve and this main curve having secondary curvatures superimposed on it and these secondary curvatures having tertiary curvatures superimposed on them.

5. In an airplane a wing that has rectangular ailerons in the forward part of said wing these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward, the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air; said wing in its width section being composed of a main curve and this main having secondary curvatures superimposed on it and these secondary curvatures having tertiary curvatures superimposed on them, also, said wing in its lengthwise section being composed of a main curve and this main curve having secondary curvatures superimposed on it.

6. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward, the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wings front edge to the front edge of the ailerons, this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air, said wing also having another aileron whose position is across the whole width of the wing placed at the tip or end part of the wing, this aileron being movable in its horizontal plane up and down, swinging from the edge that is fastened to the wing proper.

7. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air, said wing also having another aileron whose position is across the whole width of the wing, placed at the tip or end part of the wing this aileron being movable in its horizontal plane up and down, swinging from the edge that is fastened to the wing proper and said aileron being also able to move by pivoting it on its longitudinal axis while the aileron as a whole is moved at any angle from the wing proper.

8. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward, the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air, said wing having also another aileron whose position is across the whole width of the wing, placed at the tip or end part of the wing and that can be moved in any desired direction in the horizontal plane up and down in the vertical plane sideways and that can be turned to any degree angle from the vertical and horizontal planes.

9. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward, the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air, said wing also having another aileron whose position is across the whole width of the wing placed at the tip or end part of the wing said aileron being movable by pivoting it on its transverse axis.

10. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward, the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air, said wing also having another aileron whose position is across the whole width of the wing placed at the tip or end part of the wing and this aileron being movable by pivoting it on its longitudinal axis.

11. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward, the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons, this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air, said wing having its rear longitudinal part divided into ailerons these ailerons being movable so that when in the maximum moved position some of these ailerons will extend upward at a right angle to the wing proper and some of these ailerons will extend downward at a right angle to the wing and all these ailerons will move simultaneously into each braking position, whether in the minimum, intermediate or maximum braking position, these ailerons that do the braking being arranged so that one of them goes up and the next down alternately across the rear longitudinal part of the wing, these ailerons may be used in part only or in their entirety.

12. In an airplane a wing that has rectangular ailerons in the forward part of said wing, these ailerons being located about one width of such aileron back from the front edge of the wing, these ailerons when inactive are placed within the upper and lower outside lines of the wing camber and these ailerons are inactive when the airplane is flying forward on an even keel, and these ailerons moving automatically when the forward edge of the wing is forced downward, the up-rushing air flow forcing these rectangular ailerons out of the wing proper to a short distance from the wing, these ailerons are held to the wing by means of a rod, this rod being fastened to the front edge of the wing and being movable upwardly through a slot in the wing, this slot running from the wing's front edge to the front edge of the ailerons this rod being fastened to the ailerons halfway between the ends of each aileron and halfway back from the front edge of each aileron and the fastening joint being such that the ailerons can pivot forward and backward and these ailerons when in use are automatically held above the wing and at a right angle to the up-rushing flow of air, said wing having also another aileron whose position is across the whole width of the wing, placed at the tip or end part of the wing and that can be moved in any desired direction, in the horizontal plane up and down, in the vertical plane sideways and that can be turned to any degree angle from the vertical and horizontal planes, this aileron can be used as a rudder and elevator to manœuvre the airplane and thereby eliminating the airplane's tail with the rudder and elevators on it.

In testimony whereof, I affix my signature.

FRANK BAUER.